Sept. 21, 1954      W. K. BOGGS      2,689,444
LAWN EDGER HOLDER

Filed Feb. 1, 1952      2 Sheets-Sheet 1

INVENTOR.
William K. Boggs,
BY Victor J. Evans & Co.
ATTORNEYS

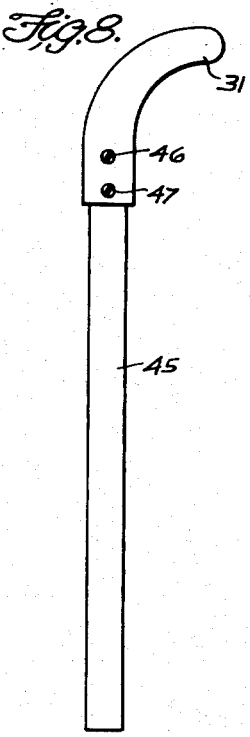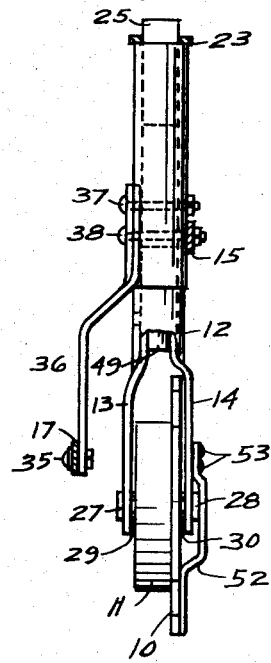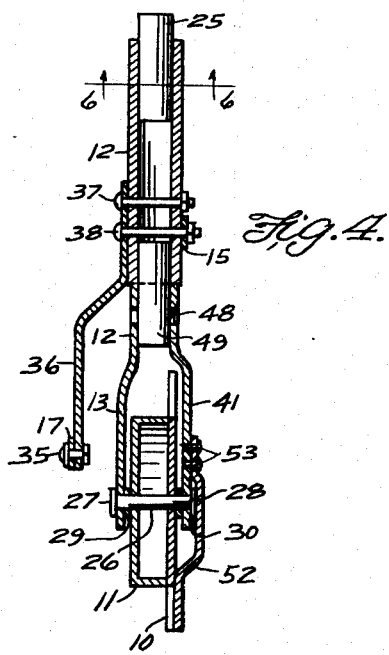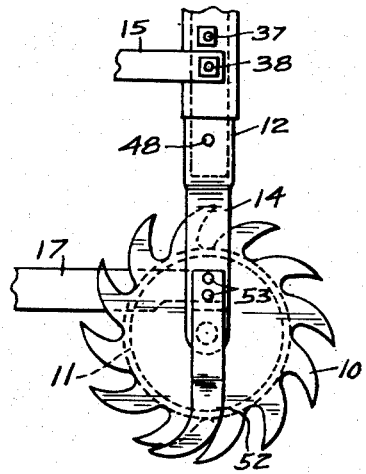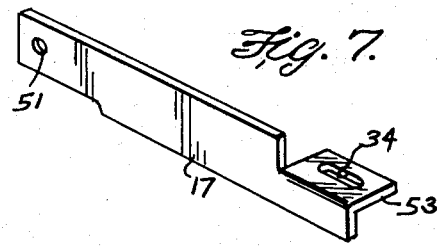

Patented Sept. 21, 1954

2,689,444

UNITED STATES PATENT OFFICE 2,689,444

LAWN EDGER HOLDER

William K. Boggs, Santa Ana, Calif.

Application February 1, 1952, Serial No. 269,509

1 Claim. (Cl. 56—256)

This invention relates to lawn edgers of the type adapted to be attached to lawn mowers and in particular a cutter wheel of the star wheel type having a drum extended from one side and having suitable levers and supporting devices for attaching the cutter to one side of a lawn mower.

The purpose of this invention is to provide a lawn edger attachment adapted to be mounted on one end of a lawn mower so that the mower, after cutting the grass, is also adapted to be used for trimming around the edges of the lawn or the like.

Various types of lawn edgers have been provided as separate and independent tools, however, with devices of this type it is necessary for the home owner to purchase a lawn mower and edger and it is also necessary to take both the edger and mower to and from the garage when it is desired to trim a lawn. With this thought in mind this invention contemplates a comparatively simple attachment adapted to be clamped or bolted to one end of a lawn mower whereby a rotary cutter may be used for trimming around the edges of a lawn and the cutter may be attached to the same lawn mower with which grass on the lawn is cut.

The object of this invention is, therefore, to provide mounting elements for a lawn edger whereby the edger may be attached to one end of a lawn mower by the average layman.

Another object of the invention is to provide an edger attachment for lawn mowers that may be installed on lawn mowers of different types without changing the design or construction of the mower.

A further object of the invention is to provide an edger attachment for lawn mowers which is of a simple and economical construction.

With these and other objects and advantages in view the invention embodies an edger attachment for lawn mowers having a vertically positioned fork with spaced bearing elements extended from the lower end of a tube, with a rotary knife and drum journaled in the lower end of the fork, with spaced horizontally positioned braces attaching the tube and fork to the end plate of a lawn mower, and with a clamp for attaching the upper end of the tubular section of the fork to the handle of the mower.

Other features and advantages of the invention will appear from the following description taken in connection with the drawings, wherein:

Figure 3 is an elevational view with parts shown in section being taken on line 3—3 of Figure 1 and showing in particular the cutter wheel mounting of the edger attachment.

Figure 4 is a vertical section through the cutter mounting of the edger attachment.

Figure 5 is a side elevational view illustrating the position of the horn on the attachment and also showing parts of the frame of the attachment with extended ends of said parts broken away.

Figure 6 is a detail showing a cross section through the upper end of the tubular base of the fork.

Figure 7 is an enlarged detail illustrating the lower tie bar for attaching the fork to the ground roller mounting of the lawn mower.

Figure 8 is a detail illustrating the ground engaging horn and handle by which the horn is mounted on the attachment.

Figure 1:
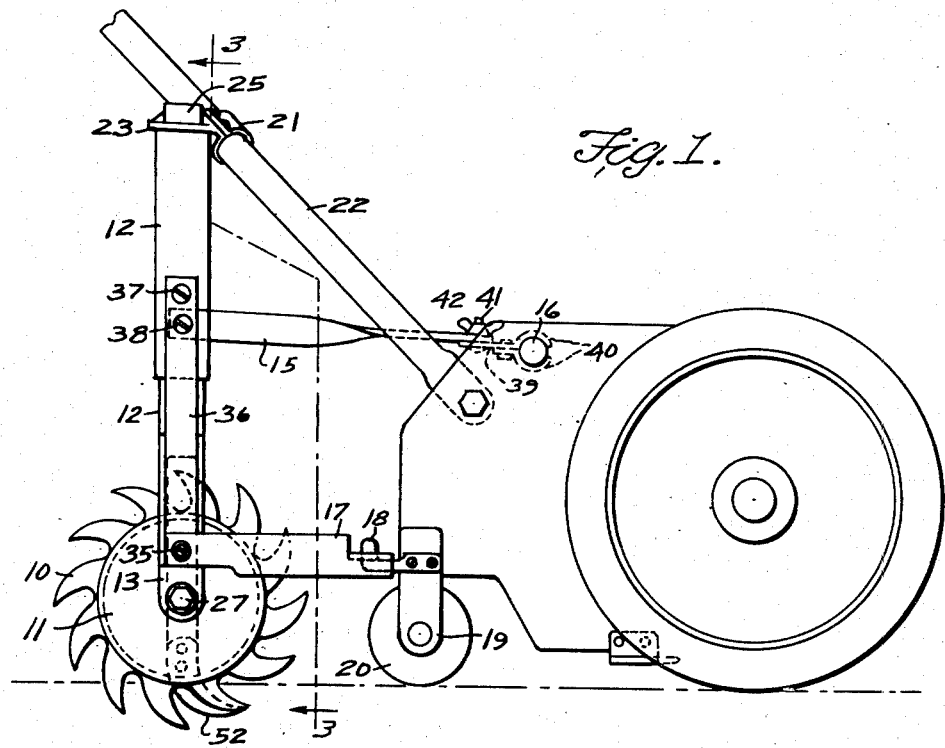
Figure 1 is a side elevational view showing the lawn edger attachment mounted on one end of a conventional lawn mower.

Referring now to the drawing wherein like reference characters denote corresponding parts the lawn edger attachment of this invention includes a cutting wheel 10 having a hub 11 extended from one side, a mounting tube 12 having a fork with side members on legs 13 and 14 extended from the lower end, a brace 15 supporting the mounting tube from the conventional transverse bar 16 of a mowing machine, a strut 17 supporting the lower end of the fork from a hook 18 on one of the end bearings 19 of the ground roller 20, and a clamp 21 positioned on the handle 22 of the lawn mower and having a plate 23 with an opening 24 therein through which a pin 25 in the upper end of the mounting tube 12 extends.

The cutter 10 with the hub 11 is journaled in the arms 13 and 14 of the fork with a shaft 26 having heads 27 and 28 on the ends and also having spacing washers 29 and 30 positioned between the hub and cutter and the arms.

The attachment may also be provided with a horn 31 which is mounted on a handle 45 with screws 46 and 47, and the opposite end of the horn is adapted to be inserted in the socket of the mounting tube 12, in which it is secured by set screws in openings 48 in the mounting tube 12 of the fork.

The strut 17 is provided with a flange 33 having an elongated slot 34 therein and with the slot positioned over the hook like projection 18 extended from the ground roller mounting 19, with a bolt 35 to the lower end of an offset arm 36 that is attached to the mounting tube 12 with bolts 37 and 38 and with the parts formed in this manner the fork and the mounting therefore, are laterally supported from the ground roller mounting 19.

Figure 2:
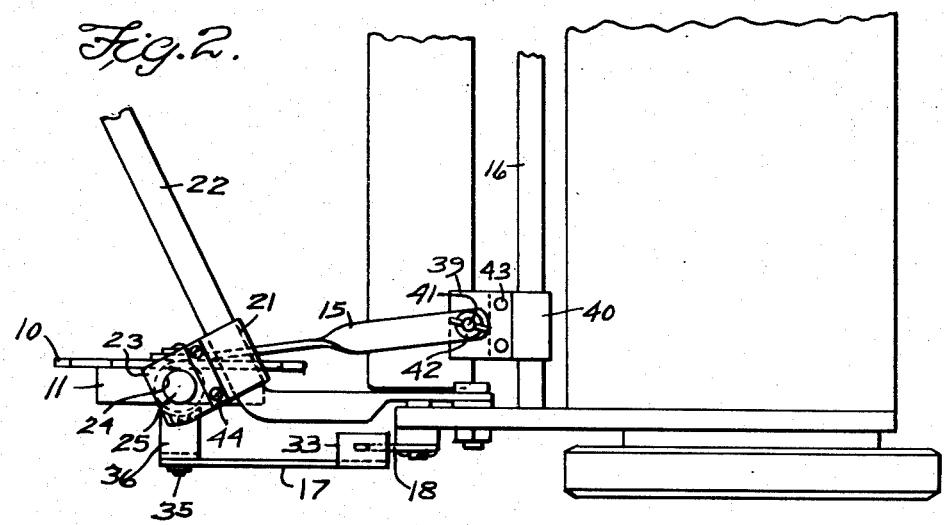
Figure 2 is a plan view also showing one end of a lawn mower illustrating the positions of the parts of the edger thereon.

The lower bolt 38 also provides means for attaching the end of the brace 15 to the mounting tube, as shown in Figures 1 and 2. The opposite end of the brace 15, which is twisted to an angle of 90 degrees, is attached to a flange 39 extended from a clamp 40 on the bar 16 with a screw 41 having a thumb nut 42 thereon. The clamp 40 is secured to the boss 16 with rivets or bolts 43.

The clamp 21 is secured to the lawn mower handle 22 with rivets or bolts 44 and it will be understood that with the clamps 21 and 40 riveted to the parts of the lawn mower these parts may remain permanently in position upon the mower.

The flange 23 extended from the clamp 21 is positioned wherein the opening or aperture 24 therein may be placed over the pin 25 of the mounting tube 12 and by raising upwardly on the lawn mower handle the flange moves off the pin.

The horn 31 provides means for independently mounting the edger on the end of a handle whereby the device may be held by hand to facilitate edging along fences, curbs and the like.

With the parts formed in this manner and with the fork including the arms 14 and 15 and pin 49 by which the fork is mounted in the lower end of the mounting tube 12 formed in this manner the fork may readily be removed and with the cutter and drum carried by the fork these elements and also the brace 15 and struts 17 which is bolted to the lower end of the offset arm 36 by the bolt 35 through the opening 15, the end thereof may be removed. These parts may however, remain in position on the lawn mower as may be desired.

With the parts arranged in this manner the attachment may readily be positioned upon the end of a lawn mower and the mower may be used for trimming around the edges of a lawn and particularly the sides of walks and the like.

The edger is also provided with a plow 52 that is attached to the arm 14 of the fork by screws 53. The lower end of the plow extends downwardly to the lower edge of the star wheel or cutter.

It will be understood that modifications may be made in the design and arrangement of the parts without departing from the spirit of the invention.

What is claimed is:

In an edger for a lawn mower including a transverse bar, a ground engaging roller having end bearings and a mounting member, and a handle, a cutting wheel provided with a plurality of curved cutting teeth extending from its outer periphery, a drum extending from one side of said wheel and being of less diameter than said teeth, a mounting tube positioned in a vertical plane, a fork-like member on the lower end of said tube defining a pair of spaced apart legs straddling said wheel and drum, a pin having its top portion projecting into the bottom of said tube and its lower portion projecting into the upper end of said fork-like member, a shaft extending through said wheel and drum and legs, heads on the outer ends of said shaft, a hook-like projection extending from said ground engaging roller mounting member, an offset arm having its upper end secured to said tube and its lower end spaced outwardly from one of said legs, a strut provided with a flange having an elongated slot in its front end receiving said hook-like projection, the outer end of said strut being secured to the lower end of said arm, a twisted brace having a vertically disposed portion secured to said mounting tube and a horizontally disposed portion extending to the transverse bar of the lawn mower, a clamp including a pair of coacting sections straddling said transverse bar and having a flange extending from one of said sections, a securing element connecting the horizontal portion of said brace to said flange, a clamp secured to the handle of the lawn mower and provided with a flange having an aperture therein, a pin extending upwardly from said mounting tube and projecting through said aperture, and a plow secured to one of said legs, the lower end of said plow lying in the same plane as the bottom of said wheel.

References Cited in the file of this patent

UNITED STATES PATENTS

| Number | Name | Date |
|---|---|---|
| 1,000,028 | Lindsey | Aug. 8, 1911 |
| 1,654,574 | Brown | Jan. 3, 1928 |
| 1,770,434 | Schleicher | July 15, 1930 |